J. E. CARVER.
Cotton Gin.
No. 51,892.
Patented Jan'y 2, 1866.
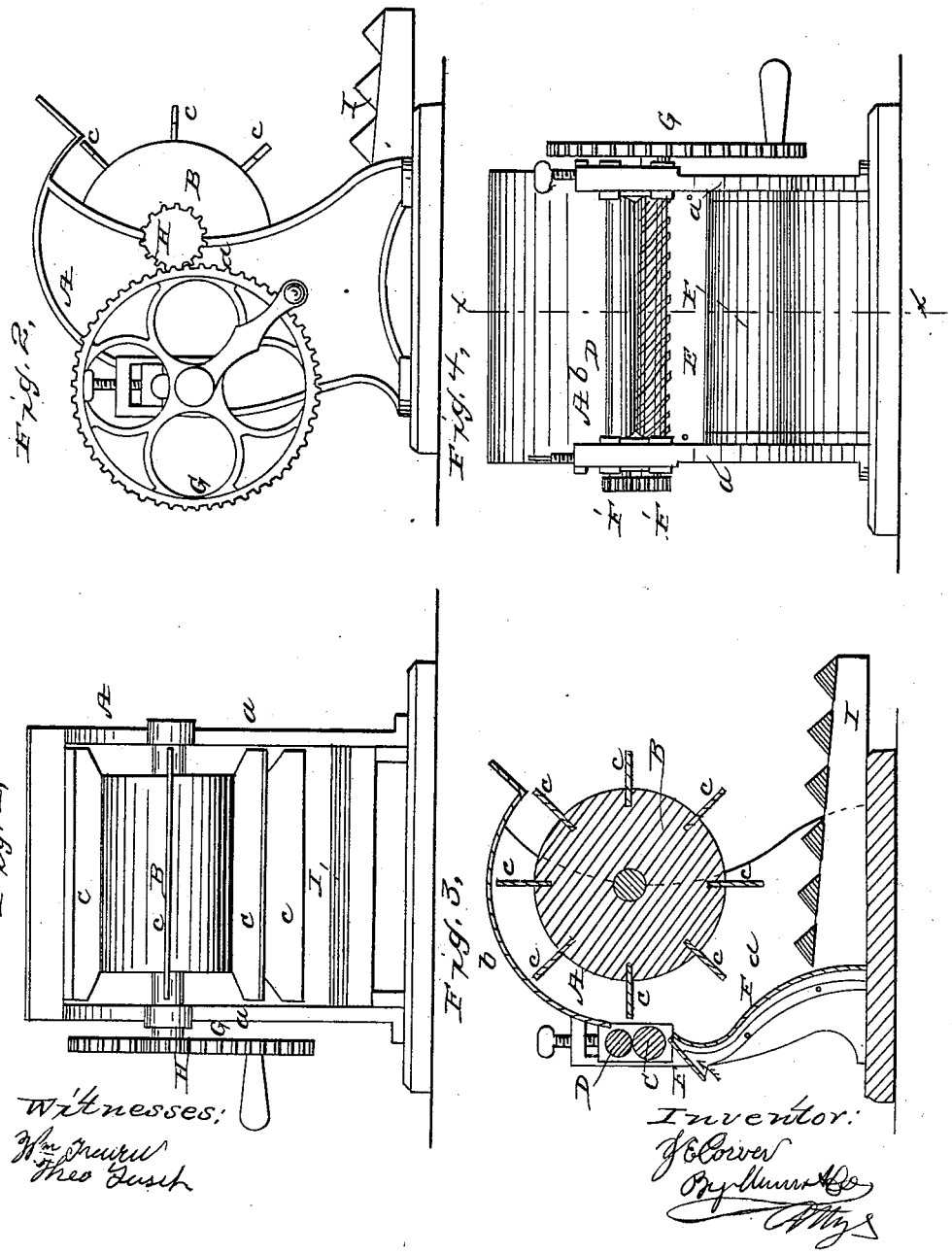

UNITED STATES PATENT OFFICE.

J. E. CARVER, OF BRIDGEWATER, ASSIGNOR TO HIMSELF, CHAS. JORDAN, OF EAST BRIDGEWATER, AND JOHN PIERCE, OF BOSTON, MASS.

IMPROVEMENT IN COTTON-GINS.

Specification forming part of Letters Patent No. 51,892, dated January 2, 1866.

*To all whom it may concern:*

Be it known that I, J. E. CARVER, of Bridgewater, in the county of Plymouth and State of Massachusetts, have invented a new and Improved Cotton-Gin; and I do hereby declare that the following is a full, clear, and exact description thereof, which will enable others skilled in the art to make and use the same, reference being had to the accompanying drawings, forming part of this specification.

This invention relates to a new and improved roller-gin for ginning cotton; and it consists in the employment or use of a spirally-grooved metal roller in connection with a roller of wood, or other suitable material, and a beater and fan, all arranged, in connection with a case, to operate as hereinafter set forth.

In the accompanying drawings, Figure 1, Sheet No. 1, is a rear view of my invention; Fig. 2, a side view of the same; Fig. 3, Sheet No. 2, a side sectional view of the same, taken in the line $x\ x$; Fig. 4, a front view of the same.

Similar letters of reference indicate like parts.

A represents what may be termed the "gin-case," the same being composed of two side pieces, $a\ a$, curved or rounded at their upper parts, and a top piece, $b$, which is secured to the upper curved parts of $a\ a$, and forms a section of a hollow cylinder which is concentric with a drum, B, the bearings of which are in the side pieces, $a\ a$, and arranged so as to be adjustable in a horizontal direction. This drum B is provided with radial wings $c$, the latter extending the whole length of the drum and projecting from it at equal distances apart, as shown in Fig. 3, the ends of the wings just clearing the top piece, $b$, of the case.

C D represent two horizontal rollers, the bearings of which are in the side pieces, $a\ a$, of the case A. These rollers are placed one over the other in the same axial plane, and the lower roller, C, which is of metal, is grooved spirally, as shown clearly in Fig. 4. The upper roller, D, which may be of wood, has a smooth periphery, the roller C working in contact with D.

Directly below the roller C there is an inclined plate, E, which serves to cause the seed to be discharged properly from the gin. This plate E is at the upper end of a curved plate, F, which is secured to the side pieces, $a\ a$, and completes the case A.

The rollers C D are connected at one end by gears F' F', and the lower roller, C, is connected, by a spur-wheel, G, and pinion H, with the drum B. (See Fig. 2.)

The power is applied to the lower roller, C, and the cotton to be ginned fed between the rollers C D, the cotton being drawn between the rollers while the seed is expelled therefrom, the spiral grooves of roller C giving a twisting movement to the seed, causing them to be readily detached from the fiber without breaking or injuring the latter.

The drum and wings $c$ serve as a beater and fan to expel the motes and dust, a current of air passing into the case below the inclined plate E.

The ginned cotton is discharged from the machine over a slotted screen, I.

Having thus described my invention, I claim as new and desire to secure by Letters Patent—

The combined beater and fan, composed of the drum B, provided with wings $c$, in combination with the spirally-grooved roller C, smooth roller D, and the case A, substantially as and for the purpose herein set forth.

JOSEPH E. CARVER.

Witnseses:
JARVIS BURRELL,
HENRY T. PRATT.